May 8, 1956 — R. P. TOOMBS — 2,744,631
STRAINER FOR DRINKING GLASSES
Filed Nov. 4, 1952
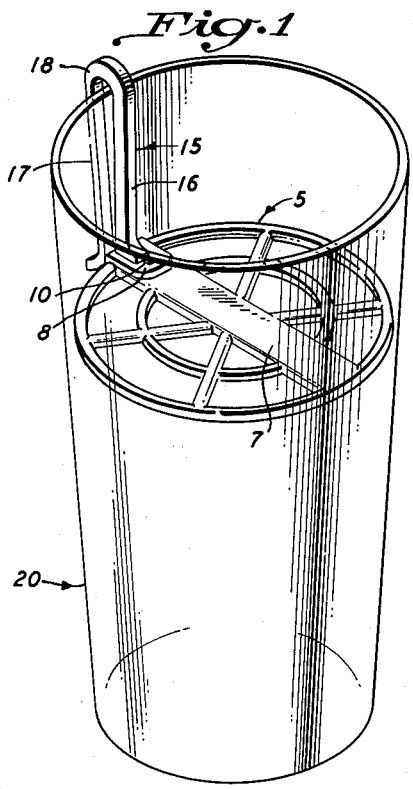
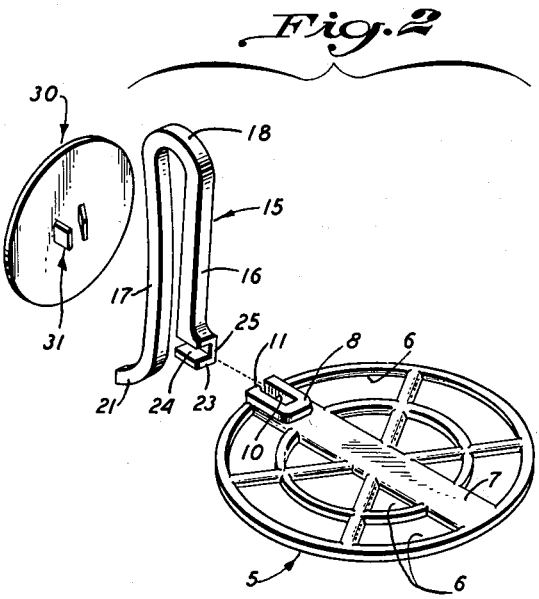
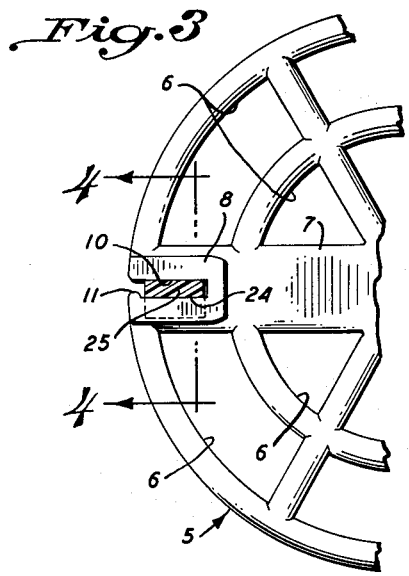
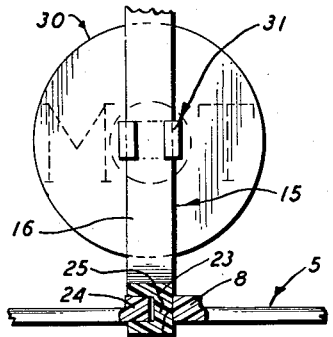
INVENTOR.
ROBERT P. TOOMBS.
BY
H. J. Stevenson
Agent.

United States Patent Office 2,744,631
Patented May 8, 1956

2,744,631

STRAINER FOR DRINKING GLASSES

Robert P. Toombs, Inglewood, Calif.

Application November 4, 1952, Serial No. 318,712

1 Claim. (Cl. 210—163)

This invention relates generally to drinking glasses and more particularly to a combined strainer and guard for use in connection with a drinking glass for retaining ice and solid ingredients, such as lemon slices, olives and other floating constituents within the glass as the latter is tilted during drinking.

It is well known that when drinking beverage from a glass, floating ice or fruit therein remains at the rim of the glass and interferes with the drinking and frequently results in spilling or dribbling of the liquid over the lips and chin, this condition being not only embarrassing to the person drinking the beverage but resulting in spotting of his or her clothing. Various forms of guards or strainers have been devised for avoiding this deleterious condition, such a strainer usually having plate-like, perforated portion insertable in a glass to extend across its interior, the strainer device further including a clamp-like handle engageable with the rim portion of the glass to retain the strainer in place. As the glass is tilted during drinking, the strainer serves to retain the ice or fruit within the glass, away from the rim thereof so that its contact with the lips and teeth of the person is avoided. Such prior strainers or guards are subject to various faults and deficiencies. For example, such devices are usually made from metal and thus are subject to rusting or other deterioration and add considerable weight to the glass with which they are used. Moreover, such metal devices possess no identification means by which one person's glass may be distinguished from that of other persons. Furthermore, such prior guards have the disadvantage of being cumbersome and not easily packaged for sale, and not readily stored for future use, their integral handle portions occupying considerable space.

It is therefore an object of this invention to provide a strainer or guard for use with a drinking glass which preferably is made as a molded, light-weight, readily cleanable plastic article. A related object is to provide a plastic strainer which may be made in a variety of colors so as to distinguish the glass of one person from another.

Another object of the invention is to provide a strainer or guard, of the character referred to, which is composed of two parts, namely, a strainer disc adapted to be inserted into a glass to extend thereacross at a considerable distance below the rim of the glass, and a clamp engageable over the rim of the glass to retain the disc in position. As a particular feature and object of the invention, the parts are releasably connectible so that they may be packaged flat in an envelope or similar container and stored in a drawer or other space of minimum size. By this provision, clamps of different colors may be attached to the discs and the strainers then applied to the glasses, the various colored clamps serving to identify the glasses used by different persons. It is also within the concept of the invention to provide identifying tabs which may be detachably applied to the clamps and suitably marked to identify the persons using the glasses or to designate the nature of the beverages being served in the glasses.

Another object is to provide a guard or strainer of the type indicated in which the strainer disc and clamp are frictionally retained in connected relation, the disc and clamp having interengaging slots, the sides of each slot frictionally gripping the sides of the other slot. A related object is to provide a detent lug on one part, for example the strainer disc, for engaging an edge of the clamp so as to releasably lock the parts in connected relation.

Further objects of the invention will appear from the following description and from the drawing, which is intended for the purpose of illustration only, and in which:

Fig. 1 is a perspective view of a drinking glass, showing my improved strainer or guard applied to use therewith;

Fig. 2 is a composite perspective view of the parts of the device;

Fig. 3 is an enlarged, fragmentary, plan view of a portion of the device; and

Fig. 4 is a cross-sectional view, taken on line 4—4 of Fig. 3.

Referring to the drawing in detail, the present improved strainer and guard device includes a disc-like element 5 which preferably is molded from a suitable plastic material. The strainer element 5 may be molded in a variety of designs but in all cases should be provided with strainer openings, such as those indicated by the reference numeral 6. The particular spoke design illustrated has been found to be satisfactory both as regards strength and straining characteristics.

The element 5 has a diametrical web 7 provided with a thickened portion or pad 8 adjacent a peripheral portion of the element. Extending inwardly into the pad 8 from the periphery of the element is a radial slot 10. As shown best in Fig. 3, the material at the outer end of one edge of the slot 10 is extended to provide a detent lug 11.

The device also includes a clamp element 15 which is also molded from plastic material possessing resiliency. The clamp element 15 is of inverted U shape, having a pair of legs 16 and 17 connected by a rounded loop 18. The leg 16 is relatively straight to adapt it to fit snugly against the inner surface of a drinking glass, such as indicated at 20 in Fig. 1. The other leg 17 is preferably curved and converges in a downward direction toward the lower end of the leg 16, the lower extremity of the leg 16 curving outwardly as shown at 21.

The lower extremity of the leg 16 is provided with a block-like enlargement 23, one side of which is provided with a slot 24 extending substantially normal to the leg. The thickness of the material at the bottom or web portion 25 of the slot 24 is substantially equal to the width of the slot 10 of the strainer element 5. It is to be further noted that the width of the slot 24 is equal approximately to the vertical thickness of the pad 8.

It is important to note that the present strainer or guard consists of two main elements, each of which is relatively flat so that a number of these elements may be packaged in a flat container, such as an envelope. To apply the device to a drinking glass 20, the elements 5 and 15 are placed as shown in Fig. 2, after which the web portion 25 of the element 15 is forced into the slot 10, the sides of the slot 10 yielding to permit such insertion and thereafter frictionally gripping the web 25 to retain the parts in connected relation. As the web 25 reaches its innermost position, the detent lug 11 snaps over the outer edge of the web to releasably lock the elements in assembled relation. The device is then ready for use and may be applied to the glass 20 containing a beverage by simply placing it in position to cause its strainer element 5 to enter the glass and the legs 16 and 17 of its clamping element 15 to receive the rim portion of the glass therebetween. As the device is lowered, the legs 16 and 17 grip the sides of the rim to frictionally retain the device in position on the glass. The strainer element 5, which is disposed at a considerable distance below the rim of the glass, serves to retain ice cubes and/or solid ingredients such as lemon slices, olives or the like within the glass at a distance from the lips of the person drinking from the glass. Consequently, when the glass is tilted during the drinking or sipping of its liquid contents, the possibility of the ice or other solids interfering with the normal flow of the liquid from the glass is effectively avoided. The uninterrupted flow of the liquid thus minimizes spilling of the liquid at the sides of the glass rim and the danger of spotting clothing is eliminated.

It has been stated that the device may be molded from plastic material of selected colors. Such choice of colors not only adds to the attractiveness of the strainer or guard but also serves as an identifying medium by which the glass being used by one person may be identified from those used by other persons. For example, the strainer discs 5 may be molded from clear uncolored plastic material while the clamping elements 15 are made from plastic material of different colors. Upon receiving a glass containing the beverage, the person notes the color of the clamping element or handle 15 and when the glass is placed temporarily on the table or bar for later use, it is easily identified and retrieved by the person who notes the color of the device.

To further aid in identifying the glasses, or the contents thereof, an identification tab 30 may be employed. The tab 30 may have imprinted thereon the name of the person for whom the drink is intended, the name of the cocktail bar, night club or other establishment in which the drink is served, or the type of drink being served in the glass. The tab 30 preferably has a resilient clip 31 by which it can be readily applied to the leg 17 of the clamping element.

Following drinking of the beverage, and prior to cleansing of the glass, the strainer or guard device is removed from the glass by simply grasping the loop portion 18 and drawing the device upwardly. The parts 5 and 15 then may be disconnected by forcing the enlargement 23 radially outwardly from the slot 10, the sides of this slot yielding to allow withdrawal of the web 25 over the detent lug 11. With the parts thus disassembled, they may be cleansed and placed flat in a drawer or other compartment for future use.

It is thus seen that my strainer device is an improvement over similar devices previously proposed. The present device is extremely simple and economical to produce and may be sold at a relatively low cost. The device is not only attractive in appearance but is highly practical in performing its intended function. As a particular feature of improvement, the device is made in two parts which are readily assembled and disassembled, this feature permitting the use of parts of different colors for identification purposes, and facilitating more thorough cleansing of the parts.

While I have herein disclosed the strainer or guard device as embodied in a preferred form of construction, by way of example, it will be apparent that various modifications might be made in the construction without departing from the spirit or scope of the invention. Consequently, without limiting myself in this respect, I claim as my invention:

A strainer device for use in connection with a drinking glass, comprising: a perforate strainer disc adapted to fit within the glass transversely thereof, said disc having an integral pad at the periphery thereof and a vertical, radially extending slot in said pad; an inverted U-shaped clamping element having legs adapted to frictionally engage the inner and outer surfaces of the side of the glass, one of said legs having a U-shaped portion at its lower end providing upper and lower horizontal portions, a vertical web connecting said horizontal portions and a horizontal slot extending normal to the leg, the width of said vertical slot being of a width substantially equal to the thickness of said web and adapted to receive and frictionally grip the same therein, and said horizontal slot being of a width substantially equal to the thickness of the pad and adapted to receive the same, said upper and lower portions being frictionally engageable against upper and lower surfaces of said pad; and detent means on said pad engageable with an edge of said web to releasably retain said element.

References Cited in the file of this patent

UNITED STATES PATENTS

| | | | |
|---|---|---|---|
| D. 27,594 | Downey | Aug. 31, | 1897 |
| 278,346 | Long | May 29, | 1883 |
| 430,502 | Altekrause | June 17, | 1890 |
| 488,616 | Schott | Dec. 27, | 1892 |
| 1,173,374 | Nolda | Feb. 29, | 1916 |
| 1,403,435 | Marvin | Jan. 10, | 1922 |
| 1,529,653 | Hooke | Mar. 17, | 1925 |
| 2,106,453 | Ekdahl | Jan. 25, | 1938 |
| 2,265,403 | Smith | Dec. 9, | 1941 |
| 2,357,063 | Swing | Aug. 29, | 1944 |

FOREIGN PATENTS

| | | | |
|---|---|---|---|
| 907,678 | France | July 9, | 1945 |